(12) United States Patent
Kim et al.

(10) Patent No.: US 7,864,273 B2
(45) Date of Patent: Jan. 4, 2011

(54) DUAL SIDED LIQUID CRYSTAL DISPLAY DEVICE VIEWABLE FROM ONE SIDE IN A REFLECTION MODE AND THE OTHER SIDE IN A TRANSMISSION MODE

(75) Inventors: Sung-Min Kim, Yongin-si (KR); Kyu-Seok Kim, Yongin-si (KR); Ho-Jung Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 266 days.

(21) Appl. No.: 11/538,365

(22) Filed: Oct. 3, 2006

(65) Prior Publication Data

US 2007/0159575 A1    Jul. 12, 2007

(30) Foreign Application Priority Data

Nov. 8, 2005    (KR) .................. 10-2005-0106377

(51) Int. Cl.
*G02F 1/1335* (2006.01)
(52) U.S. Cl. ...................... 349/114; 349/113
(58) Field of Classification Search ............ 349/74, 349/113–114
See application file for complete search history.

(56) References Cited

U.S. PATENT DOCUMENTS

| 6,574,487 | B1 * | 6/2003 | Smith et al. ............ 455/566 |
| 6,853,418 | B2 * | 2/2005 | Suzuki et al. ........... 349/113 |
| 2003/0128316 | A1 * | 7/2003 | Tsuji .................. 349/113 |
| 2004/0135943 | A1 * | 7/2004 | Kang et al. ............ 349/113 |
| 2004/0179157 | A1 * | 9/2004 | Kim et al. ............. 349/114 |
| 2004/0239832 | A1 * | 12/2004 | Saito ................. 349/74 |
| 2005/0140842 | A1 * | 6/2005 | Kim et al. ............. 349/44 |
| 2005/0174517 | A1 * | 8/2005 | Kim et al. ............. 349/114 |
| 2005/0212999 | A1 * | 9/2005 | Yang et al. ............ 349/113 |
| 2006/0050212 | A1 * | 3/2006 | Tsuchiya .............. 349/114 |

FOREIGN PATENT DOCUMENTS

CN    1512226    7/2004

* cited by examiner

*Primary Examiner*—David Nelms
*Assistant Examiner*—Jessica M Merlin
(74) *Attorney, Agent, or Firm*—Innovation Counsel LLP

(57) ABSTRACT

The present invention relates to a display device having a panel assembly that includes first and second display panels arranged to face each other. The second display panel is smaller than the first display panel. The first display panel and the second display panel are divided into a front display area and a rear display area to display images on both sides of the panel assembly.

11 Claims, 7 Drawing Sheets

DUAL SIDED LIQUID CRYSTAL DISPLAY DEVICE VIEWABLE FROM ONE SIDE IN A REFLECTION MODE AND THE OTHER SIDE IN A TRANSMISSION MODE

CROSS-REFERENCE TO RELATED APPLICATION

This application claims priority to and the benefit of Korean Patent Application No. 10-2005-0106377 filed in the Korean Intellectual Property Office on Nov. 8, 2005, the entire contents of which are incorporated herein by reference.

FIELD OF THE INVENTION

The present invention relates to a lighter, thinner, and smaller display device having a panel assembly for displaying images on both sides.

DESCRIPTION OF THE RELATED ART

Recently, as liquid crystal displays (LCDs) have become smaller and lighter and their performance has greatly improved the LCD is currently used for almost all information processing apparatus that require a display. For example, a folding type of mobile phone generally employs two display panels. However, this type of mobile phone can be inconvenient to carry because of the overall thickness of the two display panels which make the structure more complicated and costly.

SUMMARY OF THE INVENTION

The present invention provides a display device that is lighter, thinner, and smaller in which a panel assembly includes facing display panels that can display images on both sides having a front display area formed as a transparent type and a rear display area formed as a reflective type. The reflecting layer may be formed on the rear display area of the first or the second display panel. The reflecting layer may be composed of highly reflective material such as aluminum (Al) or silver (Ag). The second display panel may include an insulation substrate and a color filter formed on the insulation substrate, and may further include a reflecting layer formed between the insulating substrate and the color filter in the rear display area. A prism may be formed on the rear surface of the light guide corresponding to the rear display area of the panel assembly. According to the embodiments described above, a display device that is lighter, thinner, and smaller can be provided by using only one panel assembly for displaying images on both sides the panel assembly.

DETAILED DESCRIPTION OF THE EMBODIMENTS

Figure 1:
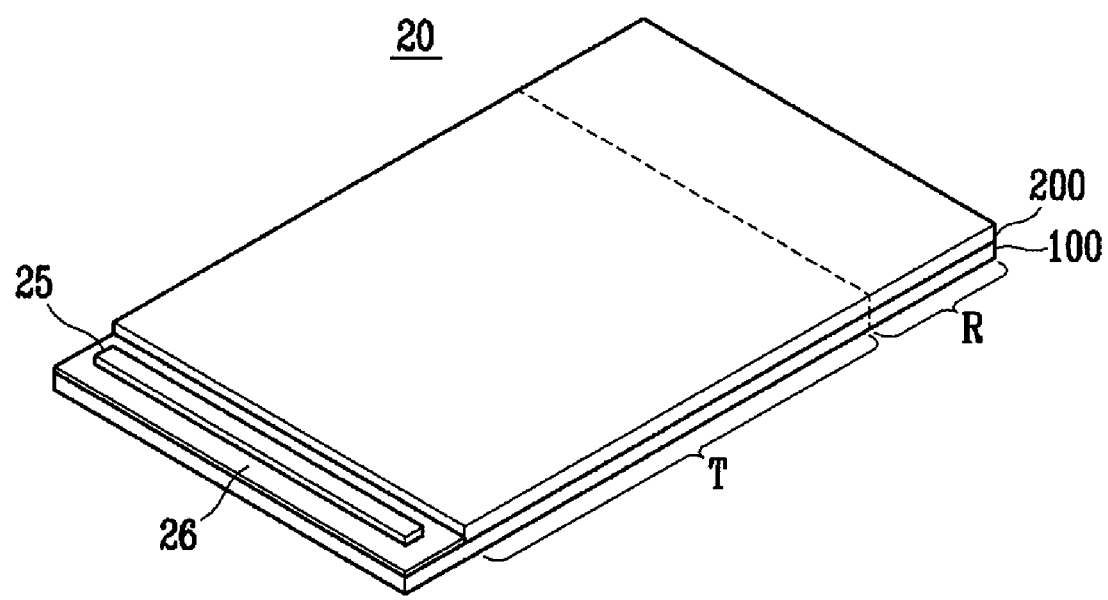
FIG. 1 is a perspective view of a panel assembly according to the first exemplary embodiment of the present invention.

In the accompanying drawings, a panel assembly advantageously uses an amorphous silicon (a-Si) thin film transistor (TFT) formed with a 5-sheet mask process as an exemplary embodiment. For various exemplary embodiments, constituent elements having the same constitution are designated by the same reference numerals and are explained representatively in the first exemplary embodiment. In the other exemplary embodiments, only constituent elements that are different from the first exemplary embodiment are described.

In the drawings, the thicknesses of layers, films, panels, regions, etc., are exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
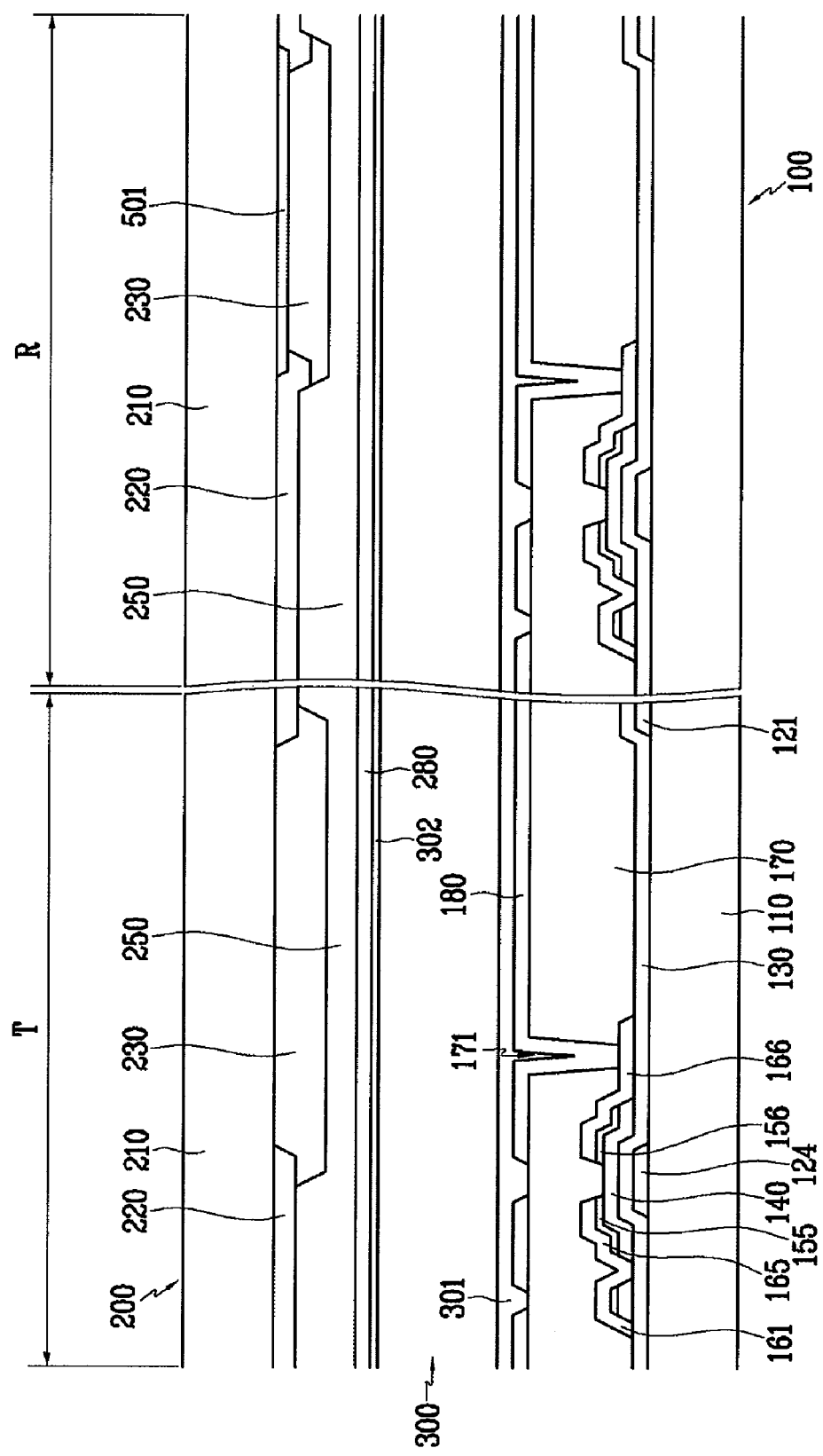
FIG. 2 is a cross-sectional view of the panel assembly of FIG. 1.

FIG. 1 is a perspective view of a panel assembly according to the first exemplary embodiment of the present invention, and FIG. 2 is a cross-sectional view of the main part of the panel assembly illustrated in FIG. 1. As shown in FIG. 1, a panel assembly 20 includes first and second display panels 100 and 200 arranged to face each other. The size of the second display panel 200 is smaller than that of the first display panel 100 in which the first display panel 100 may be the rear substrate and the second display panel 200 may be the front substrate. The panel assembly 20 is divided into a front display area T and a rear display area R to display images on both sides in which the front display area T is formed as a transparent type and the rear display area R is formed as a reflective type.

A driver integrated circuit (IC) chip 25 is mounted on a portion of the first display panel 100 that is not overlapped by the second display panel 200. A passivation layer 26 is formed on the portion where the driver IC chip is formed to protect the driver IC chip and the first display panel.

Referring to FIG. 2, the internal structure of the panel assembly will be described in detail. The panel assembly 20 according to the first exemplary embodiment of the present invention includes a first display panel 100, a second display panel 200 facing the first display panel 100, and a liquid crystal layer 300. Alignment layers 301 and 302 are formed on the first and second display panels 100 and 200, respectively, to align the liquid crystal molecules in a twisted nematic mode, i.e., the liquid crystal molecules are sequentially twisted from the first display panel 100 to the second display panel 200. Alternatively, the liquid crystal molecules may be aligned vertically with respect to the first and second display panels 100 and 200. Although not shown in the drawings, panel assembly 20 may further includes a spacer which is disposed between the first and second display panels 100 and 200 to provide a space therebetween.

A plurality of gate lines 121 extending mainly in a horizontal direction are formed on a first insulation substrate 110 which is composed of an insulating material such as glass, crystal, ceramic, or plastic. Each of gate lines 121 has a plurality of regions forming a plurality of gate electrodes 124.

Although it is not shown in the drawings, a storage electrode line may be formed on the same layer as gate lines 121 on substrate 110.

Gate lines 121 and gate electrodes 124 are composed of a metal such as Al, Ag, Cr, Ti, Ta, Mo, or alloys thereof and may be formed as single or multiple layers of such metals having good conductivity as well as corrosion resistance and abrasion resistance. The side of each gate line 121 is inclined with respect to a horizontal plane, preferably at angle of about 30 to 80 degrees.

A gate insulating layer 130 composed of silicon nitride (SiNx) is formed on the gate conductors 121 and 124. A plurality of data lines 161, a plurality of source electrodes 165 connected to the data lines 161, and a plurality of drain electrodes 166 are formed on gate insulating layer 130. Each of data lines 161 extends mainly in a vertical direction, crosses gate lines 121, and puts out a plurality of branches toward each of drain electrodes 166. Gate electrodes 124, source electrodes 165, and drain electrodes 166 form the three electrodes of a thin film transistor.

Data lines 161, source electrodes 165, and drain electrodes 166 may be composed of a conductive material such as Cr, Mo, Al, or alloys thereof, and be formed as a single layer or multiple layers.

Semiconductor layer 140 is formed under conductive layers 161, 165, and 166. Semiconductor 140 is composed of amorphous silicon and forms the channel unit of the thin film transistor.

Ohmic contacts 155 and 156 are formed between semiconductor layer 140 and conductors 161, 165, and 166 to reduce contact resistance. Ohmic contacts 155 and 156 are composed of silicide, or amorphous silicon in which an n-type impurity is highly doped. The island type ohmic contact 156 faces the other ohmic contact 155 with the gate electrode 124 therebetween.

A passivation layer 170 is formed on the conductors 161, 165, and 166. Passivation layer 170 may be composed of an organic insulating material having excellent planarization characteristics and photosensitivity such as a-Si:C:O or a-Si:O:F that has a low dielectric constant and is formed through plasma enhanced chemical vapor deposition (PECVD), or an inorganic insulating material such as silicon nitride. Passivation layer 170 has a plurality of contact holes 171 to expose at least a part of drain electrodes 166.

A plurality of pixel electrodes 180 are formed on passivation layer 170. The pixel electrodes 180 are made of a transparent conductor such as indium tin oxide (ITO) or indium zinc oxide (IZO).

Next, the second display panel 200 will be described in detail. Light blocking members 220 are formed on the second insulation substrate 210 that is composed of an insulating material such as glass, crystal, ceramic, or plastic, like the first insulation substrate 110. Light blocking members 220 have an opening facing the pixel electrodes 180 of the first display panel 100 and block light leaking from between pixels neighboring each other. In order to block light from entering the channel units of the thin film transistor from the outside, light blocking members 220 are also formed on the region corresponding to the thin film transistor. Light blocking members 220 may be formed as a single layer or multiple layers including a metal such as chromium, chromium oxide, chromium nitride, or alloys thereof, or a photosensitive organic material with a black-based pigment added thereto to block light. Carbon black or titanium oxide may be used for the black-based pigment.

A reflecting layer 501 is formed on the rear display area R of the second insulation substrate 210 to correspond to the pixel electrodes 180 of the first display panel 100. Although the reflecting layer 501 is formed on the layer under light blocking members 220 in FIG. 2, the present invention is not limited thereto. The reflecting layer 501 may be formed on light blocking members 220. The reflecting layer 501 is made of high reflectivity material such as Al or Ag.

Color filters 230 having three primary colors are sequentially disposed on the second insulation substrate 210 on which light blocking members 220 are formed. The colors of color filters 230 are not limited to the three primary colors, but may variously consist of at least one color. Although the boundaries of each of color filters 230 are positioned on light blocking members 220, the present invention is not limited thereto. The edges of the neighboring color filters 230 may overlap each other to function as light blocking members 220 to block the leakage of light. Color filters 230 must be disposed on the reflecting layer 501 in the rear display area R. That is, the reflecting layer 501 must be disposed between the second insulation substrate 210 and color filters 230.

A planarization film 250 composed of an insulating material is formed on light blocking members 220 and color filters 230. Planarization film 250 protects color filters 230 and planarizes the entire second display panel 200, and it is mainly made of an acryl-based epoxy material.

A common electrode 280 is formed on planarization film 250. Common electrode 280 is composed of a transparent conductive material such as ITO or IZO, and generates an electric field to drive the liquid crystal molecules together with the pixel electrodes 180.

According to the above constitution, the panel assembly 20 can display images on the second display panel 200 in the front display area T and on the first display panel 100 in the rear display area R. That is, the panel assembly 20 can display images on both sides the panel assembly, or selectively display image on one side the panel assembly if necessary.

Figure 3:
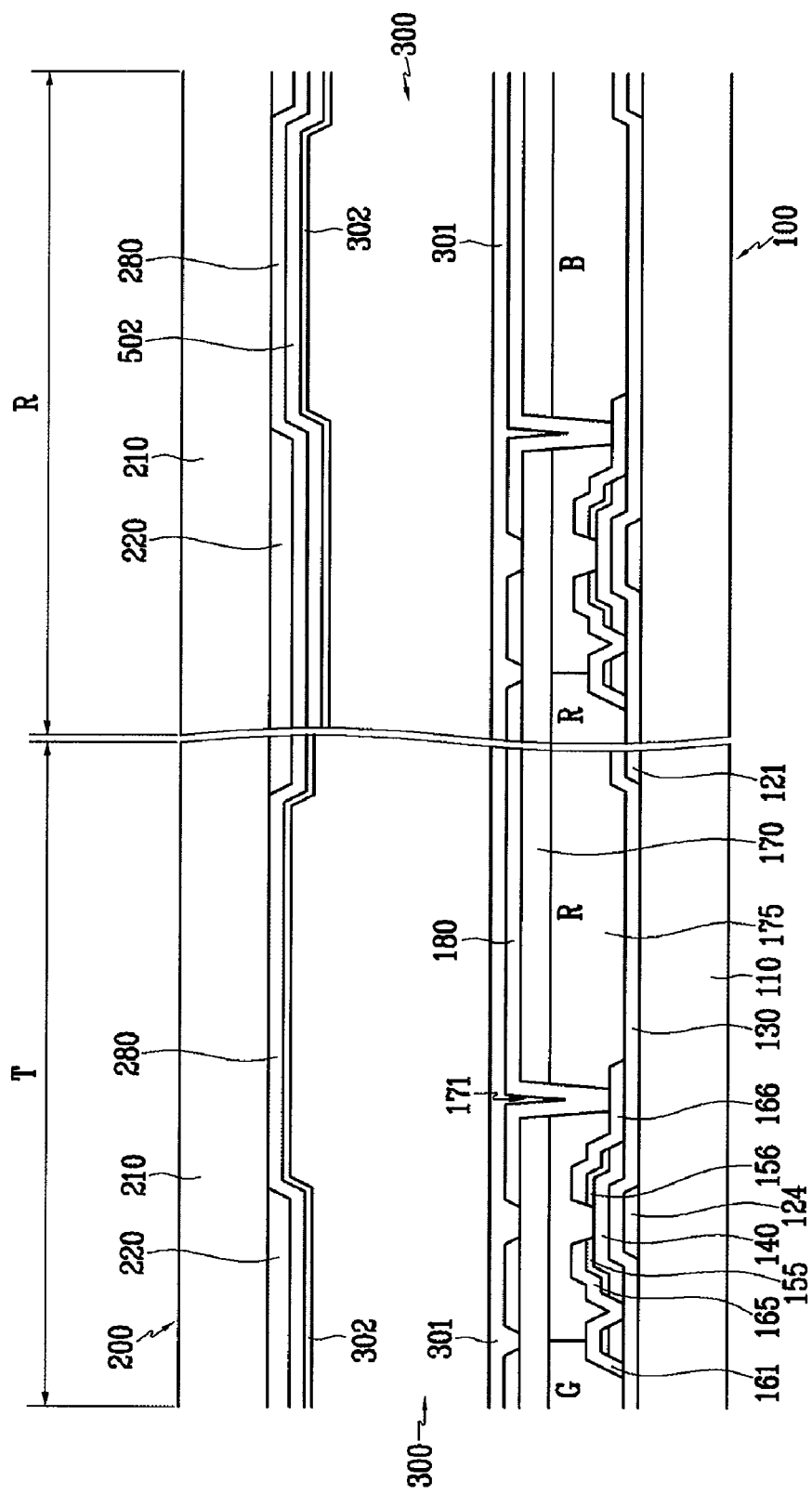
FIG. 3 is a cross-sectional view of a panel assembly according to the second exemplary embodiment of the present invention.

Referring to FIG. 3, a panel assembly 20 according to the second exemplary embodiment of the present invention will be described in detail. FIG. 3 shows a color filter on array (COA) mode panel assembly 20 where color filters 175 are formed on the first display panel 100.

In this panel assembly 20 according to the second exemplary embodiment of the present invention, the first display panel 100 becomes a rear substrate and the second display panel 200 becomes a front substrate. The panel assembly 20 is divided into a front display area T and a rear display area R to display images on both sides thereof. The front display area T of the panel assembly 20 is formed as a transparent type, and the rear display area R is formed as a reflective type.

The first display panel 100 will now be described in detail. Gate conductors 121 and 124, a gate insulating layer 130, a semiconductor 140, ohmic contacts 155 and 156, and data conductors 161, 165, and 166 are formed on the first insulation substrate 110 the same as in the first exemplary embodiment.

The color filters 175 having three primary colors are sequentially disposed on the data conductors 161, 165, and 166. The colors of the color filters 175 are not limited to the three primary colors, but may variously consist of at least one color.

A passivation layer 170 is formed on the color filters 175. Passivation layer 170 is composed of an organic material having excellent planarization characteristics and photosensitivity, an insulating material such as a-Si:C:O or a-Si:O:F that has a low dielectric constant and is formed through PECVD, or an inorganic insulating material such as silicon nitride.

Passivation layer 170 and the color filters 175 have a plurality of contact holes 171 to expose at least a part of the drain electrodes 166.

A plurality of pixel electrodes 180 are formed on passivation layer 170. The pixel electrodes 180 are made of a transparent conductor such as ITO or IZO.

Next, the second display panel 200 will be described in detail. Light blocking members 220 are formed on the second insulation substrate 210. Light blocking members 220 have an opening facing the pixel electrodes 180 of the first display panel 100, and block light leaking from between pixels neighboring each other. In order to block light from entering the channel units of the thin film transistor from the outside, light blocking members 220 are also formed on the region corresponding to the thin film transistor.

A common electrode 280 is formed on light blocking members 220. Common electrode 280 is composed of a transparent conductive material such as ITO or IZO, and generates an electric field to drive the liquid crystal molecules together with the pixel electrodes 180.

A reflecting layer 502 is formed on common electrode 280 of the rear display area R to correspond to the pixel electrodes 180 of the first display panel 100. The reflecting layer 502 is composed of a high reflectivity material such as Al or Ag. Although the reflecting layer 502 is formed on common electrode 280 in FIG. 3, the present invention is not limited thereto. The reflecting layer 502 may be formed under common electrode 280.

Also, although common electrode 280 that is composed of a transparent conductive material and the reflecting layer 502 that is made of a material including Al or Ag are formed in the rear display area R, the present invention is not limited thereto. In the rear display area R, common electrode 280 that is composed of a transparent conductive material may be omitted, and the reflecting layer 502 that is made of a material including Al or Ag may function as common electrode 280.

Depending on the structure of the color filters 175 formed on the first display panel 100, light blocking members 220 may be omitted, and a planarization film may be further added between light blocking members 220 and common electrode 280.

According to the above constitution, the COA mode panel assembly 20 where the color filters 175 are formed on the first display panel 100 can display images on the second display panel 200 in the front display area T and on the first display panel 100 in the rear display area R. That is, the panel assembly 20 can display images on both sides the panel assembly, or selectively display image on one side the panel assembly if necessary.

Figure 4:
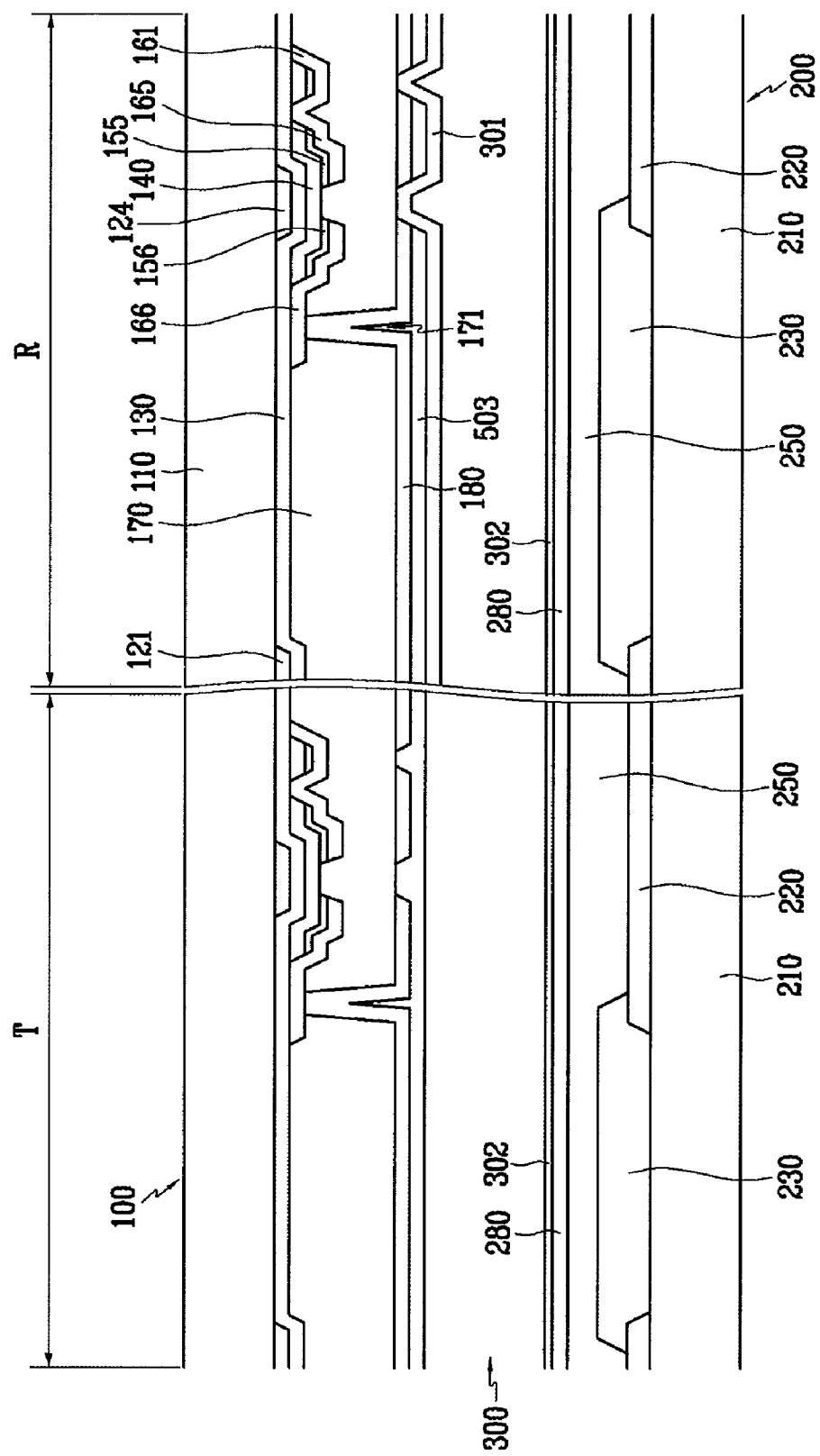
FIG. 4 is a cross-sectional view of a panel assembly according to the third exemplary embodiment of the present invention.

Referring to FIG. 4, a panel assembly 20 according to the third exemplary embodiment of the present invention will be described in detail.

The panel assembly 20 according to the third exemplary embodiment of the present invention has first and second display panels 100 and 200 arranged to face each other. The size of the second display panel 200 is smaller than that of the first display panel 100. The first display panel 100 becomes a front substrate, and the second display panel 200 becomes a rear substrate. The panel assembly 20 is divided into a front display area T and a rear display area R to display an image on both areas. The front display area T of the panel assembly 20 is formed as a transparent type, and the rear display area R is formed as a reflective type.

The first display panel 100 will now be described in detail. Gate conductors 121 and 124, a gate insulating layer 130, a semiconductor 140, ohmic contacts 155 and 156, data conductors 161, 165, and 166, a passivation layer 170, and pixel electrodes 180 are formed on the first insulation substrate 110, the same as in the first exemplary embodiment.

A reflecting layer 503 is formed on the pixel electrodes 180 of the rear display area R. The reflecting layer 503 is composed of a high reflectivity material such as Al or Ag. Although the reflecting layer 503 is formed on the pixel electrodes 180 in FIG. 4, the present invention is not limited thereto. The reflecting layer 503 may be formed under the pixel electrodes 180.

Also, although the pixel electrodes 180 that are composed of a transparent conductive material and the reflecting layer 503 that is made of a material including Al or Ag are formed in the rear display area R in FIG. 4, the present invention is not limited thereto. The pixel electrodes 180 that are composed of a transparent conductive material may be omitted, and the reflecting layer 503 that is made of a material including Al or Ag may function as the pixel electrodes 180.

The second display panel 200 includes light blocking members 220, color filters 230, a planarization film 250, and a common electrode 280 on the second insulation substrate 210, the same as in the first exemplary embodiment. However, the reflecting layer 501 formed on the second insulation substrate 210 in the first exemplary embodiment (see FIG. 2) is omitted.

According to the above constitution, the upper and lower areas of the panel assembly 20 are changed with each other so that images can be seen from the first display panel 100 in the front display area T and from the second display panel 200 in the rear display area R. That is, the panel assembly 20 can display images on both sides the panel assembly, or selectively display image on one side the panel assembly if necessary.

Figure 5:
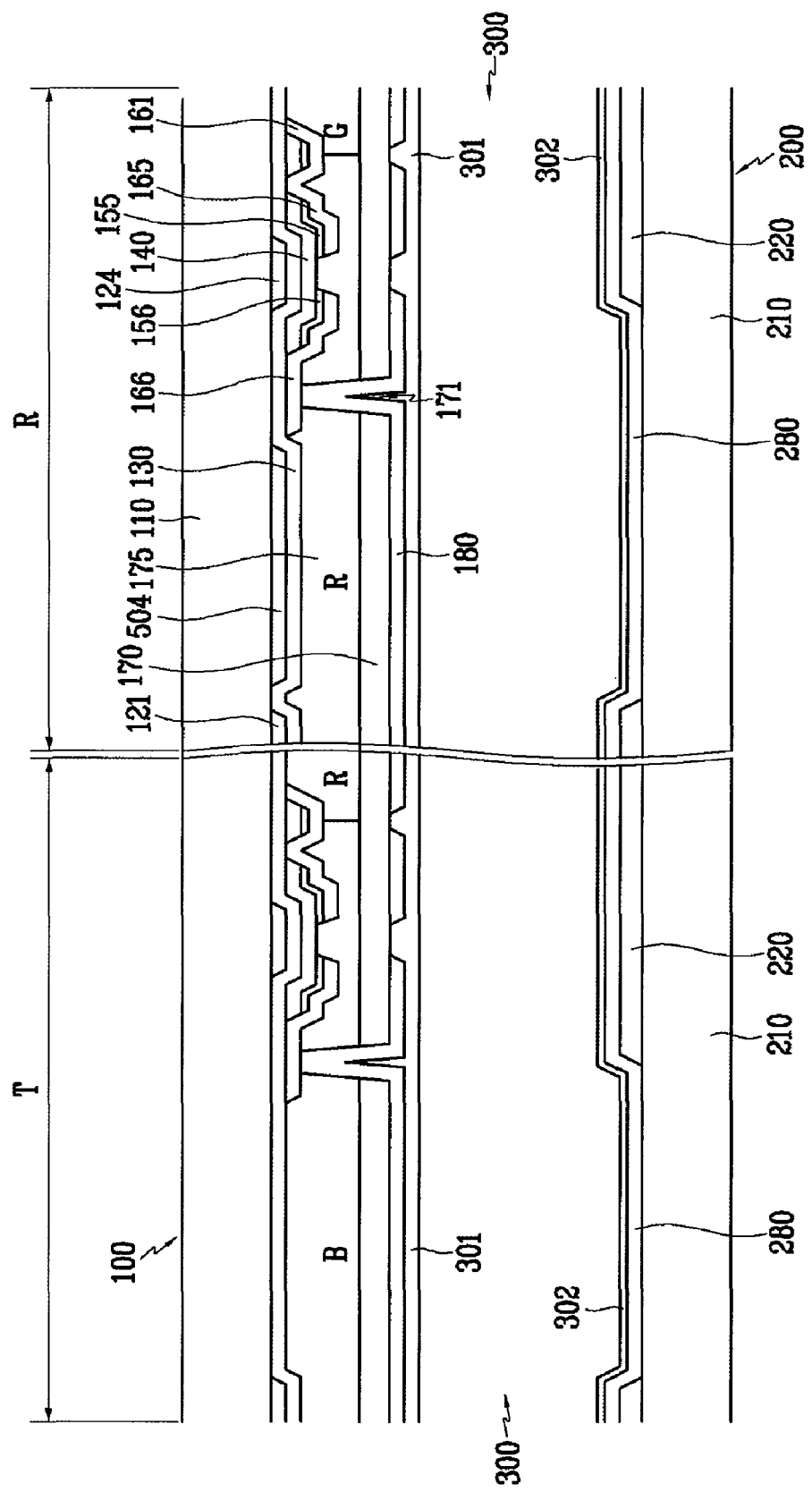
FIG. 5 is a cross-sectional view of a panel assembly according to the fourth exemplary embodiment of the present invention.

Referring to FIG. 5, a panel assembly 20 according to the fourth exemplary embodiment of the present invention will be described in detail. FIG. 5 shows a color filter on array (COA) mode panel assembly 20 where color filters 175 are formed on the first display panel 100.

The panel assembly 20 according to the fourth exemplary embodiment of the present invention includes first and second display panels 100 and 200 arranged to face each other. The size of the second display panel 200 is smaller than that of the first display panel 100. The first display panel 100 becomes a front substrate, and the second display panel 200 becomes a rear substrate. The panel assembly 20 is divided into a front display area T and a rear display area R to display images on both areas. The front display area T of the panel assembly 20 is formed as a transparent type, and the rear display area R is formed as a reflective type.

The first display panel 100 will now be described in detail. A plurality of gate lines 121 are formed on the first insulation substrate 110 to extend mainly in a horizontal direction. Each of gate lines 121 has a plurality of regions forming a plurality of gate electrodes 124.

Also, a reflecting layer 504 is formed at the same layer as the gate conductors including gate lines 121 and the gate electrodes 124 on the first insulation substrate 110 of the rear display area R. The reflecting layer 504 is composed of a high reflective material such as Al or Ag.

Gate insulating layer 130 is formed on the gate conductors 121 and 123 and the reflecting layer 504, and a semiconductor 140, ohmic contacts 155 and 156, and data conductors 161, 165, and 166 are formed on gate insulating layer 130, the same as in the first exemplary embodiment.

Color filters 175 having three primary colors are sequentially disposed on the data conductors 161, 165, and 166. The colors of the color filters 175 are not limited to the three primary colors, but may variously consist of at least one color.

A passivation layer 170 is formed on the color filters 175. Passivation layer 170 is composed of an organic material having excellent planarization characteristics and photosensitivity, an insulating material such as a-Si:C:O or a-Si:O:F that has a low dielectric constant and is formed through PECVD, or an inorganic insulating material such as silicon nitride.

Passivation layer 170 and the color filters 175 have a plurality of contact holes 171 to expose at least a part of the drain electrodes 166.

A plurality of pixel electrodes 180 are formed on passivation layer 170. The pixel electrodes 180 may be made of a transparent conductor such as ITO or IZO.

The second display panel includes light blocking members 220 and a common electrode 280 formed on the second insulation substrate 210. Depending on the structure of the color filters 175 formed on the first display panel 100, light blocking members 220 may be omitted, and a planarization layer may be further added between light blocking members 220 and common electrode 280.

According to the above constitution, in the COA mode panel assembly 20, the upper and lower areas of the panel assembly 20 are changed with each other so that images can be seen from the first display panel 100 in the front display area T and from the second display panel 200 in the rear display area R. That is, the panel assembly 20 can display images on both sides the panel assembly, or selectively display image on one side the panel assembly if necessary.

Figure 6:
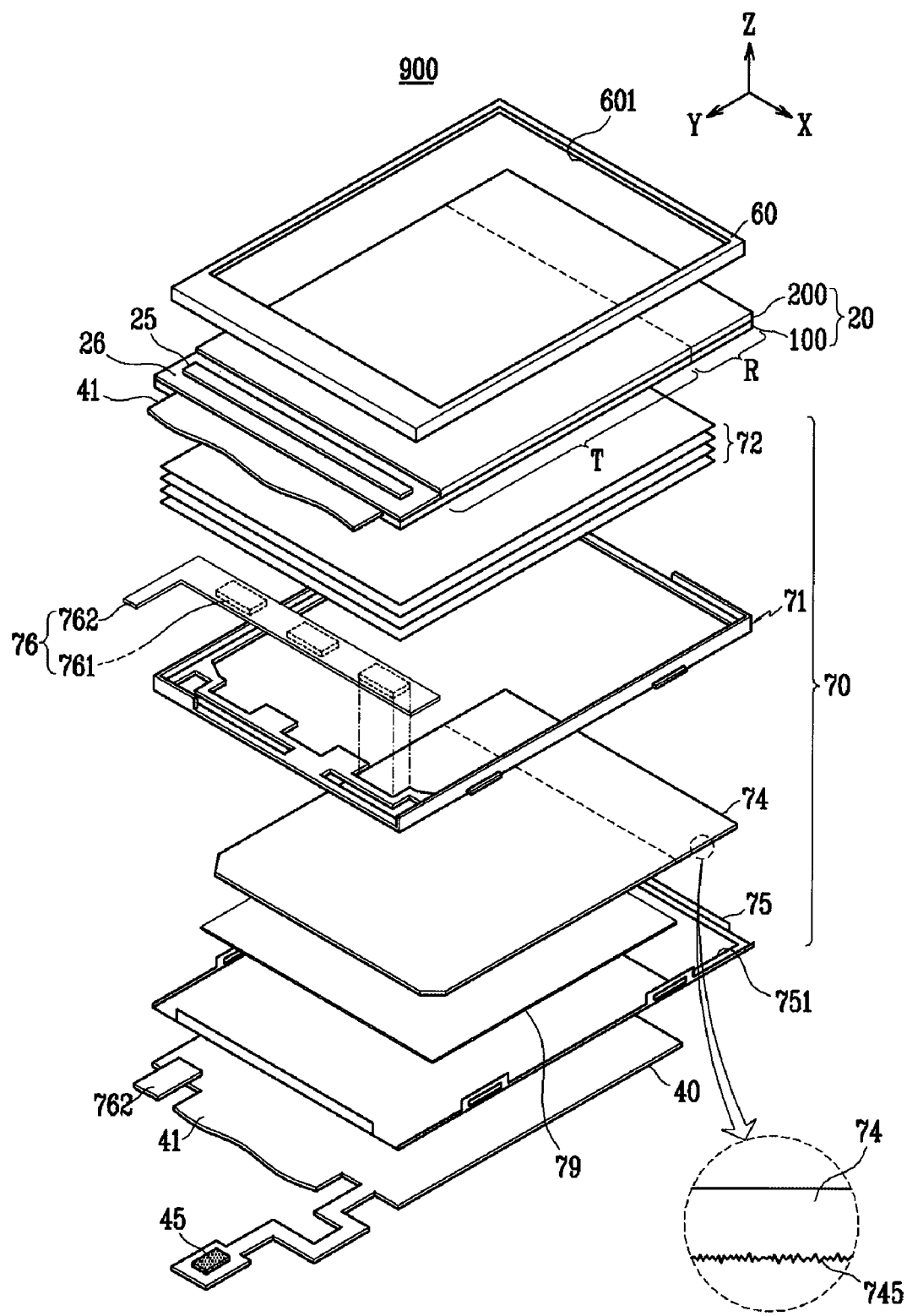
FIG. 6 is an exploded perspective view of a display device including the panel assembly illustrated in FIG. 1.

FIG. 6 shows a display device 900 having the panel assembly 20 according to one of the embodiments of the present invention. In FIG. 6, a display device used for a folding type of mobile phone is illustrated as an exemplary embodiment of the present invention. Also, FIG. 6 illustrates a liquid crystal display panel as a panel assembly 20.

As shown in FIG. 6, the display device 900 includes a backlight assembly 70 for providing light and a panel assembly 20 for receiving the light and displaying images. In addition, the display device 900 includes supporting members 60, 71, and 75 for fixing and supporting each of parts including the panel assembly 20, and may further include supplementary parts. The supporting members include first and second supporting members 71 and 75 forming a backlight assembly 70, and the third supporting member 60 for fixing and supporting the panel assembly 20 on the backlight assembly 70.

Although the display device includes both the first and second supporting members 71 and 75 in FIG. 6, the present invention is not limited thereto. The display device may include at least one of the first supporting member 71 and the second supporting member 75.

The display device 900 further includes a flexible printed circuit film (FPC) 41 for connecting the panel assembly 20 and a printed circuit board (PCB) 40, and a driving IC chip 25 disposed at one side of the panel assembly 20 and connected to the flexible printed circuit film to control the panel assembly 20. The driver IC chip 25 is surrounded by a passivation layer 26. In FIG. 6, the flexible printed circuit film 41 is shown as cut for the purpose of illustration, but the actual flexible printed circuit film 41 is connected.

The panel assembly 20 is divided into a front display area T and a rear display area R. The front display area T is formed as a transparent type, and the rear display area R is formed as a reflective type.

The front display area T of the panel assembly 20 is larger than the rear display area R. In particular, the display device 900 may be used for a folding type of mobile phone. In this case, the front display area T of the panel assembly 20 is disposed to face the inner side of a mobile phone folder and the rear display area R of the panel assembly 20 is disposed to face the outer side of the mobile phone folder. Accordingly, in a state where the folder is closed, a relatively small amount of information such as time may be seen through the relatively small-sized rear display area R of the panel assembly 20. And, in a state where the folder is open, a relatively large amount of information may be seen through the relatively large-sized front display area T of the panel assembly 20.

The PCB 40 transmits a signal to the panel assembly 20 through the flexible printed circuit film 41. Also, a mobile phone connector 45 is mounted on one end of the PCB 40. The PCB 40 receives a signal denoting the level of opening and closing of a folder window through the mobile phone connector 45.

The backlight assembly 70 includes a light source unit 76 for generating light, a light guide 74 for guiding light generated by the light source unit 76 to the panel assembly 20, a reflecting member 79 disposed at the rear side of the light guide 74, and an optical sheet 72 disposed between the light guide 74 and the panel assembly 20 to improve luminance and to uniformly diffuse the light. These constituent elements of the backlight assembly 70 are fixed and housed by the first and second supporting member 71 and 75.

Although light emitting diodes (LEDs) 761 mounted on a light source circuit board 762 are shown as the light source unit 76 in FIG. 6, the present invention is not limited thereto. A modulized linear light source or a planar light source may be used as the LED 761. Also, although three LEDs 761 are illustrated in FIG. 6, the present invention is not limited thereto. The number of LEDs 761 may vary if necessary. The light source circuit board 762 connected to the PCB 40 receives a light source control signal from the PCB 40 and drives the LEDs 761 in accordance with the received light source control signal.

The light guide 74 is made of material including Polymethylmethacrylate (PMMA) or Poly Carbonate (PC), which has high strength and excellent transmittance so that it is not easily deformed or broken, and is transparent. As shown in FIG. 6, a prism 745 is formed on the rear surface of the light guide 74 that corresponds to the rear display area R of the panel assembly 20, that is, the area overlapped with the rear display area R of the panel assembly 20. Accordingly, the light efficiency of the image displayed on the rear display area R of the panel assembly 20 can be improved.

Figure 7:
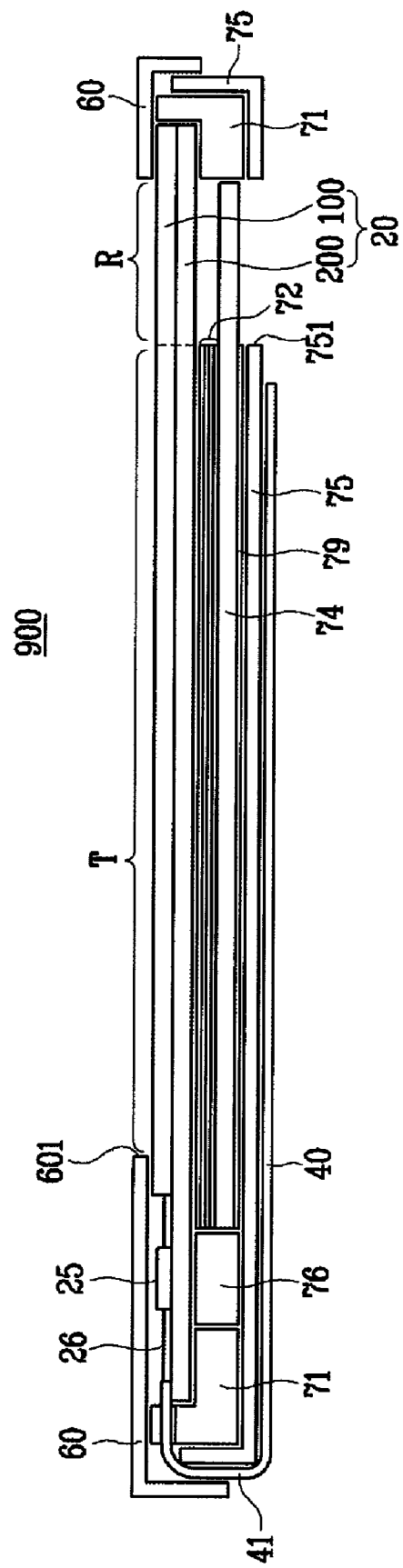
FIG. 7 is a cross-sectional view of the display device illustrated in FIG. 6.

As shown in FIG. 7, the third supporting member 60 fixes the panel assembly 20 onto the backlight assembly 70 in connection with the first and second supporting members 71 and 75. Here, a first display window 601 is formed in the third supporting member 60 to expose the front display area T of the panel assembly 20 to the outside. Further, a second display window 751 is formed in the second supporting member 75 to expose the rear display area R of the panel assembly 20 to the outside.

The optical sheet 72 and the reflecting member 79 have an area corresponding to the front display area T of the panel assembly 20. That is, the rear display area R of the panel assembly 20 is not overlapped with the optical sheet 72 and the reflecting member 79. Therefore, an image displayed on the rear display area R of the panel assembly 20 can be seen at the outside through the second display window 751 of the second supporting member 75.

According to the above constitution, the display device 900 can display images on both sides of the folding unit of the folding type of mobile phone using one panel assembly 20 for displaying images on both sides thereof.

In a state where the folding unit of the mobile phone is closed, an image displayed toward the rear side of the folding unit, that is, toward the outside of the mobile phone, is formed on the rear display area R of the panel assembly 20 using external light. In an indoor place or a dark room where the external light cannot be used, the image is formed on the rear display area R of the panel assembly 20 by receiving light emitted from the light source unit 76 of the backlight assembly 70 through the light guide 74. In addition, in a state where the folding unit of the mobile phone is open, an image displayed toward the front side of the folding unit, that is, toward the inside, is formed on the front display area T of the panel assembly 20 by receiving light emitted from the light source unit 76 of the backlight assembly 70 through the light guide 74 and using the received light.

As described above, the thickness of the display device 900 can be minimized and the portability can be improved by using only one panel assembly 20. That is, the display device 900 can be much lighter, thinner, and smaller. Also, the structure of the display device 900 can be simplified and productivity in a manufacturing process can be improved by using only one panel assembly 20.

While this invention has been described in connection with what is presently considered to be practical exemplary embodiments, it is to be understood that the invention is not limited to the disclosed embodiments, but, on the contrary, is intended to cover various modifications and equivalent arrangements that will be apparent to those skilled in the art.

What is claimed is:

1. A panel assembly comprising:
   a first display substrate;
   a reflecting layer formed on the first display substrate;
   a second display substrate that is smaller than the first display substrate and is arranged to face the first display substrate,
   a gate conductor formed on the second display substrate and having a gate line and a gate electrode connected to the gate line;
   a gate insulating layer covering the gate conductor;
   a semiconductor layer formed on the gate insulating layer and having at least a predetermined portion overlapped with the gate electrode;
   an ohmic contact layer formed on the semiconductor layer and divided by the gate electrode as a center; and
   a data conductor formed on the ohmic contact layer and including a source electrode and a drain electrode separated by the gate electrode,
   wherein the first display substrate and the second display substrate are divided into a front display area formed as a transparent type and a rear display area formed as a reflective type to display images on both sides of the panel assembly;
   wherein a common electrode is formed on the first display substrate, and a pixel electrode is formed on the second display substrate; and
   wherein the reflecting layer is formed on the common electrode to be overlapped with the common electrode.

2. The panel assembly of claim 1, wherein the reflecting layer is composed of a high reflectivity material including aluminum (Al) or silver (Ag).

3. The panel assembly of claim 1, wherein the first display substrate is disposed on a rear surface to display an image on the rear display area, and the second display substrate is disposed on a front surface to display an image on the front display area.

4. The panel assembly of claim 1, wherein
the second display substrate includes an insulation substrate and a color filter formed on the insulation substrate, and
wherein the reflecting layer is formed between the insulating substrate and the color filter in the rear display area.

5. The panel assembly of claim 1, wherein the first display substrate further includes:
   a color filter formed on the data conductor.

6. A display device comprising:
   a panel assembly including a first display substrate and a second display substrate that are divided into a front display area formed as a transparent type and a rear display area formed as a reflective type to display images on both sides of the panel assembly;
   a light guide disposed on a rear side of the panel assembly;
   a light source unit disposed on a side of the light guide;
   an optical sheet disposed between the light guide and the panel assembly in the front display area;
   a reflecting member disposed on the rear side of the light guide in the front display area; and
   a supporting member for housing and supporting the constituent elements of the display device,
   wherein the first display substrate includes an insulation substrate, a gate conductor having a gate line formed on the insulation substrate and a gate electrode connected to the gate line, a gate insulating layer covering the gate conductor, a semiconductor layer formed on the gate insulating layer and having at least a predetermined portion overlapped with the gate electrode, an ohmic contact layer formed on the semiconductor layer and divided by the gate electrode as a center, and a data conductor formed on the ohmic contact layer and including a source electrode and a drain electrode separated by the gate electrode;
   wherein a common electrode is formed on the first display substrate, and a pixel electrode is formed on the second display substrate; and
   wherein the reflecting layer is formed on the common electrode to be overlapped with the common electrode.

7. The display device of claim 6, wherein the reflecting layer is formed of a high reflectivity material including Al or Ag.

8. The display device of claim 6, wherein a prism is formed on a rear surface of the light guide corresponding to the rear display area of the panel assembly.

9. The display device of claim 6, wherein the supporting member further includes:
   a first supporting member for supporting edges of the panel assembly;
   a second supporting member connected to the first supporting member for housing and supporting the light guide, the optical sheet, the reflecting member, and the light source unit; and
   a third supporting member connected to the first supporting member and the second supporting member to fix the panel assembly.

10. The display device of claim 9, wherein
the third supporting member includes a first display window to expose the front surface of the panel assembly in the front display area, and
the second supporting member includes a second display window to expose the rear surface of the panel assembly in the rear display area.

11. The display device of claim 6, wherein the panel assembly is a liquid crystal panel.

* * * * *